March 26, 1940. C. E. HATHORN 2,195,029
RIVET AND PROCESS FOR APPLYING SAME
Filed April 12, 1938
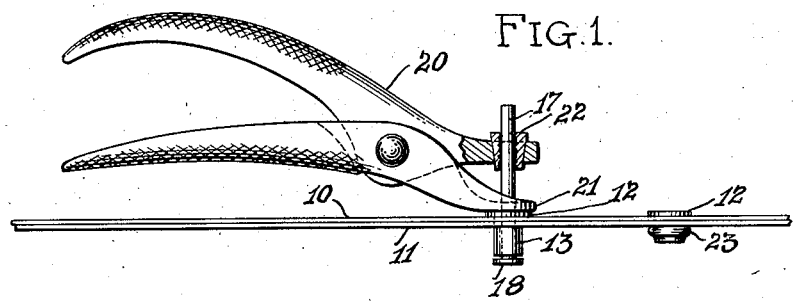
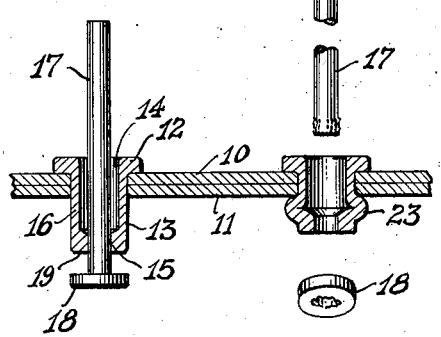
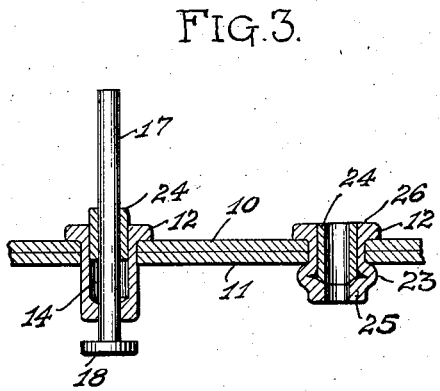
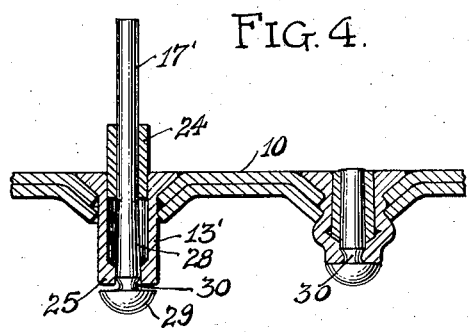
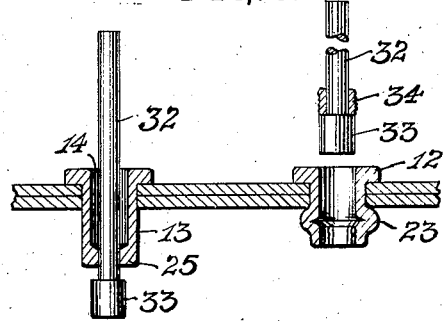
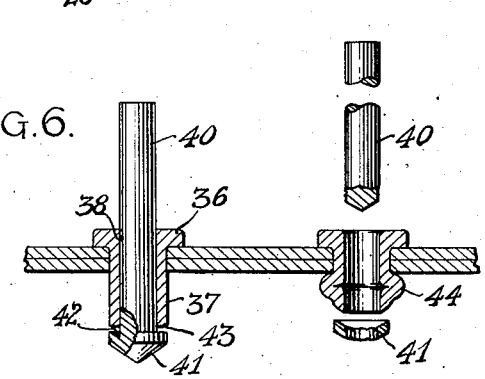
INVENTOR
CHARLES E. HATHORN.
BY
ATTORNEY Patented Mar. 26, 1940

2,195,029

UNITED STATES PATENT OFFICE 2,195,029

RIVET AND PROCESS FOR APPLYING SAME

Charles E. Hathorn, Kenmore, N. Y., assignor to Curtiss-Wright Corporation, a corporation of Delaware Application April 12, 1938, Serial No. 201,490

3 Claims. (Cl. 85—40)

This invention relates to that type of rivet which is adapted for application and driving solely from one side of work to be riveted together. In the fabrication of metal structures, one mode of attaching components to one other is by riveting and it so happens that in certain instances, it is difficult to provide means for backing up the rivet when same is being driven. This problem has become evident in the aircraft art where certain of the structures are so devised as to preclude the insertion of bucking bars or the like within a closed structure and accordingly, it is essential to use a type of rivet which may be applied and driven wholly from the exterior of the structure. It is appreciated that there are rivets of this type in the prior art and the present invention undertakes to teach certain improvements in these rivets by which a reduction in weight may be obtained along with adequate strength and a greater facility for attaching the rivets.

An object of the invention is to provide what may be termed a "one side" rivet in which unnecessary protrusions are eliminated from the driven rivet. An associated object is to provide "one side" rivets of reduced weight and reduced bulk of material, which however, can be augmented by the use of auxiliary means to provide greater shearing strength in a riveted joint. A further object of the invention is to eliminate in certain applications, the necessity for leaving a driving pin in a finally driven rivet. Still another object is to provide a "one side" rivet which is adapted for fabrication in various types of head forms, such as flat-head, oval-head and the like.

Specifically, the invention includes several alternative arrangements which may be better understood by reading the annexed detailed description in connection with the drawing in which:

Fig. 1 is a side elevation of metal plates showing the mode of driving the rivets of the invention;

Fig. 2 is a section through a pair of metal plates showing one embodiment of the rivet in its position of primary insertion and in its ultimate form, respectively;

Fig. 3 is a section through a pair of metal sheets showing the rivet of Fig. 2 augmented by a shear sleeve by which the strength of the rivets is increased; and Figs. 4, 5, and 6 are sections through metal plates showing alternative forms of rivets.

Referring first to Fig. 2 I show overlying metal plates 10 and 11 suitably drilled for attachment by rivets. The left side of the figure shows a "one side" rivet after insertion through the plate holes but prior to being driven whereas, the right-hand side shows the rivet in its finally driven form, along with the remainder of the elements which were necessary to the driving of the rivet. The rivets comprise a head 12 from which a shank 13 extends, the shank being provided with an enlarged bore 14 at the head end of the rivet and with a reduced bore 15 at the opposite end of the rivet. By virtue of the bore 14 the wall of the shank at 16 is relatively thin. A driving pin 17 is assembled through the rivet shank, said pin having a head 18 adapted to bear upon the anti-head end of the shank, at 19. The head 18 is fairly thin and its shear strength with respect to the pin 17 is so organized as to be slightly greater than the strength of the thin wall portion 16 against collapse or bulging. The rivet is driven by the use of a tool similar to that shown at 20 in Fig. 1, the tool being in the form of a plier having a slotted foot 21 bearing upon the head 12 and a clutch 22 embracing the pin 17. By applying squeezing pressure to the handles of the tool 20, the pin 17 is drawn upwardly relative to the rivet head, the head 18 pressing the shank and 19 upwardly and bulging the wall portion 16 to the form shown at 23. Upon further application of squeezing pressure to the tool 20, sufficient force may be applied to shear the head 18 from the pin 17 whereupon, the pin 17 is drawn outwardly from the rivet and the head 18 in the form of a small washer drops clear of the riveted joint.

In Fig. 3 I show the same type of rivet as that indicated in Fig. 2 but I add a sleeve 24 which fits between the bore 14 and pin 17. This sleeve is shorter than the bore 14 but is of sufficient length to reach from the thickened end portion 25 of the rivet shank to the top face 26 of the head 12. As the rivet is squeezed, a slight extrusion of the material thereof binds the sleeve 24 firmly into the rivet and by virtue of the cross-sectional area of the sleeve 24 the strength of the riveted joint is improved with respect to shear between the plates 10 and 11. Since it is contemplated that these rivets be made of relatively soft material in order to properly form the bulbs 23 the wall 16 must be quite thin. Accordingly, the rivet without the sleeve 24 is not very strong in shear but by the addition of the sleeve, which may be of harder and stronger material, the strength of the joint is substantially increased. It will be seen that the hollow through which the pin is withdrawn lightens the rivet considerably and it will also be noted that there are no redundant protrusions annexed to the rivet after the rivet is driven as in the case of certain "one side" rivets of the prior art.

In Fig. 4 I show an adaptation of the rivet wherein the head is flat, the rivet being arranged for use in connection with countersunk plates. The stem 17' is slightly tapered as at 28 and the head 29 is not adapted to shear off as in the prior embodiment. When driven by the same sort of tool as shown in Fig. 1, the tapered portion of the stem 17' expands the rivet shank and sleeve 24 while the shank is being bulbed so that the driven rivet has the effect of being a solid rivet of great strength and having watertight or airtight characteristics. The tapered portion 28 of the rivet stem may be provided with an annular groove 30 into which a portion of the thickened end wall 25 of the rivet may extrude when the rivet is driven to firmly lock the tapered portion of the pin 17' into the shank 13', preventing possible displacement of the pin when the joint is completed. After the rivet has been driven, the protruding portion of the pin 17' may be clipped off and dressed flush with the surface of the rivet head and metal plates.

In Fig. 5 I show an alternate form of driving pin 32 provided with an integral rigid driving head 33 by which the shank 13 is bulbed by the application of the driving tool. The diameter of the head 33 will be substantially the same as that of the bore 14, so that, after the shank is bulbed, continued application of driving pressure will cause the head 33 to shear a part of the thickened head 25, permitting the driving pin to be pulled clear of the riveted joint, the head 33 carrying with it a small washer 34 which previously was integral with the rivet end 25. The rivet, when driven, will have substantially the same strength and characteristics as that shown in Fig. 2 but this mode of rivet driving will obviously not permit of the use of a reenforcing sleeve such as that shown at 24 of Fig. 3.

In Fig. 6 I show a slightly different arrangement in which the rivet comprises a head 36 having a shank 37 provided with a through bore 38 of consistent diameter. A driving pin 40 is a snug fit in the bore 38 and carries a driving head 41 at its lower end, this head having a groove 42 therebeneath the surfaces of which are engageable with the inner end 43 of the rivet shank. Driving of the rivet is accomplished in the same manner as indicated in Fig. 1. The head 41 engages the end of the rivet shank and the groove 42 constrains the end of the shank from radial outward displacement, when driving force is applied, so that a perfect bulb 44 is formed without any possibility of the head 41 pulling through the rivet. Upon further application of driving pressure, the head 41 is sheared from the driving pin 40, the pin pulling clear of the work and the head 41 likewise dropping free.

The stepped bore construction wherein the end of the rivet shank is thicker than the intermediate walls of the shank as shown in Figs. 2 to 5 inclusive is necessary if the driving head on the pin does not constrain the shank from outward displacement; without this thickened end, the driving pin would tend to pull through the work without properly bulbing the rivet. The arrangement of Fig. 6 includes a rivet shank of uniform wall thickness between the head and shank ends of the rivet which would not be satisfactory unless the grooved driving head 41 were used. Without the grooved head, the end of the shank would tend to upset when driving force is applied resulting in an improper bulb on the rivet.

It will be apparent that any one of the rivets of the types disclosed may be constructed with round, square, or flat heads without interfering with the proper assembly and driving thereof. It is known that certain "one side" rivets of the prior art are not susceptible to variant forms of rivet heads since the heads in those cases are used in connection with the driving of the rivet whereas in the present case the foot 21 of the driving tool merely rests upon the head to provide reaction as the driving pin of the rivet is withdrawn outwardly.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a rivet of the type adapted to be applied and driven from the same side of work to be riveted, a headed shank having a bore defining toward the head end a thin shank wall and toward the other end a thick end wall, and a pin having a head engaging said end wall extending through the bore and beyond said rivet head, said pin being organized for withdrawal through the bore to bulb the thin-walled part of the shank, said pin head being of such thickness as to shear off after bulbing of said shank wall.

2. In a rivet of the type adapted to be applied and driven from the same side of work to be riveted, a headed shank having an axial bore and a driving pin engaging within said shank, the pin having a head of such strength, in shear, as to bulb the rivet shank and then shear off upon application of driving pressure greater than that necessary to bulb the shank.

3. In a rivet of the type adapted to be applied and driven from one side of work to be riveted, a headed shank having a bore defining a thin shank wall toward the head end, and having a smaller bore defining a thick shank wall toward the anti-head end; a tapered driving pin, having a head at its larger end, passed through said thick shank wall and closely fitted to the bore thereof, the pin head engaging said thick shank wall end and the pin passing through the shank and beyond the shank head; and a sleeve fitted exteriorly into the larger shank bore and fitted interiorly over the smaller pin end, said sleeve being shorter than the shank larger bore; whereby, upon driving of the rivet by pulling the small pin end away from the shank head, the thin shank wall bulges over work being fastened and the tapered pin expands said sleeve and shank wall into intimate contact with the work, one sleeve end finally abutting the inner end of said thick shank wall.

CHARLES E. HATHORN.